(12) United States Patent
Gillono et al.

(10) Patent No.: US 12,271,752 B2
(45) Date of Patent: Apr. 8, 2025

(54) TECHNIQUES FOR MANAGING CORES FOR STORAGE

(71) Applicant: EMC IP Holding Company LLC, Hopkinton, MA (US)

(72) Inventors: John Gillono, North Chelmsford, MA (US); Philippe Armangau, Acton, MA (US); Vamsi K. Vankamamidi, Hopkinton, MA (US); Ashok Tamilarasan, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 591 days.

(21) Appl. No.: 16/945,387

(22) Filed: Jul. 31, 2020

(65) Prior Publication Data

US 2022/0035663 A1 Feb. 3, 2022

(51) Int. Cl.
*G06F 3/06* (2006.01)
*G06F 9/30* (2018.01)
*G06F 9/48* (2006.01)
*G06F 9/50* (2006.01)

(52) U.S. Cl.
CPC .......... *G06F 9/4881* (2013.01); *G06F 3/0611* (2013.01); *G06F 3/0653* (2013.01); *G06F 3/0659* (2013.01); *G06F 3/067* (2013.01); *G06F 9/30047* (2013.01); *G06F 9/5027* (2013.01); *G06F 2209/5018* (2013.01)

(58) Field of Classification Search
CPC .. G06F 9/4881; G06F 9/30047; G06F 9/5027; G06F 3/0611; G06F 3/0653; G06F 3/067; G06F 2209/5018

USPC .......................................................... 710/6
See application file for complete search history.

(56) References Cited

U.S. PATENT DOCUMENTS

| | | | | |
|---|---|---|---|---|
| 7,243,354 | B1* | 7/2007 | Chhabra | G06F 9/546 718/100 |
| 8,196,147 | B1* | 6/2012 | Srinivasan | H04L 67/568 719/310 |
| 8,327,103 | B1 | 12/2012 | Can et al. | |
| 8,782,665 | B1* | 7/2014 | Sandstrom | G06F 9/544 370/336 |
| 10,038,744 | B1 | 7/2018 | Dagan et al. | |
| 10,481,802 | B1* | 11/2019 | Gao | G06F 3/0659 |
| 10,671,453 | B1 | 6/2020 | Kamran et al. | |
| 10,678,480 | B1 | 6/2020 | Armangau et al. | |
| 2003/0061332 | A1* | 3/2003 | Narad | G06F 9/3885 709/223 |
| 2012/0254484 | A1* | 10/2012 | Yang | G06F 9/545 710/47 |

(Continued)

*Primary Examiner* — Titus Wong
(74) *Attorney, Agent, or Firm* — BainwoodHuang

(57) ABSTRACT

A method of managing CPU cores in a data storage apparatus (DSA) configured to perform both host I/O (Input/Output) processing and background storage processing is provided. The method includes (a) selectively classifying background storage tasks in one of a first classification for longer-running tasks and a second classification for shorter-running tasks; (b) selecting CPU cores that are running fewer than a threshold number of first-classification background tasks to process host I/O requests; and (c) processing the host I/O requests on their selected CPU cores. An apparatus, system, and computer program product for performing a similar method are also provided.

19 Claims, 6 Drawing Sheets

(56) References Cited

U.S. PATENT DOCUMENTS

| | | | |
|---|---|---|---|
| 2015/0278152 A1* | 10/2015 | Beale | G06F 11/1464 |
| | | | 710/5 |
| 2016/0092109 A1* | 3/2016 | Wu | G06F 3/061 |
| | | | 711/114 |
| 2017/0052889 A1* | 2/2017 | Traeger | G06F 12/0866 |
| 2017/0322751 A1* | 11/2017 | Cohen | G06F 3/0659 |
| 2018/0077236 A1* | 3/2018 | Niikura | G06F 3/0635 |
| 2018/0113738 A1* | 4/2018 | Nichols | G06F 9/4881 |
| 2019/0391940 A1* | 12/2019 | Vasudevan | G06F 3/0613 |

\* cited by examiner

TECHNIQUES FOR MANAGING CORES FOR STORAGE

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage processors include multiple CPU (Central Processing Unit) cores. Various storage requests and other data processing tasks may be distributed among these cores to allow for enhanced performance using multiprocessing.

SUMMARY

The manner in which computing tasks are distributed to CPU cores can have a significant impact on system performance. For example, if many long-running background tasks are distributed to many cores at once, tasks for processing newly arriving host I/Os may be starved of CPU resources, resulting in increased latency when responding to host I/Os. One option to address this scenario could be to exclusively pre-allocate one group of cores for host I/Os and another group of cores for background storage processing. However, that option suffers from a lack of flexibility and can itself lead to inefficiencies, e.g., at extremes of I/O or background activity.

Therefore, it would be desirable to dynamically assign both background storage and host I/O processing tasks to cores in a manner that prevents starvation of CPU resources while also promoting efficiency in CPU utilization. This result may be achieved by selectively assigning host I/O tasks to cores that are running few, if any, long-running background storage tasks. In some embodiments, the number of cores allowed to execute long-running background storage tasks may be limited, such as, for example, to some maximum percentage of the total cores in the system that are available for processing storage operations. In some embodiments, short-running background storage tasks may be assigned to cores in a balanced manner. In some embodiments, short-running background storage tasks may be preferentially assigned to a first subset of cores to reduce resource contention with host I/O requests.

In one embodiment, a method of managing CPU cores in a data storage apparatus (DSA) configured to perform both host I/O (Input/Output) processing and background storage processing is provided. The method includes (a) selectively classifying background storage tasks in one of a first classification for longer-running tasks and a second classification for shorter-running tasks; (b) selecting CPU cores that are running fewer than a threshold number of first-classification background tasks to process host I/O requests; and (c) processing the host I/O requests on their selected CPU cores. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for dynamically assigning both background storage and host I/O processing tasks to cores in a manner that prevents starvation of CPU resources while also promoting efficiency in CPU utilization. This result may be achieved by selectively assigning host I/O tasks to cores that are running few, if any, long-running background storage tasks. In some embodiments, the number of cores allowed to execute long-running background storage tasks may be limited, such as, for example, to some maximum percentage of the total cores in the system that are available for processing storage operations. In some embodiments, short-running background storage tasks may be assigned to cores in a balanced manner. In some embodiments, short-running background storage tasks may be preferentially assigned to a first subset of cores to reduce resource contention with host I/O requests.

Figure 1:
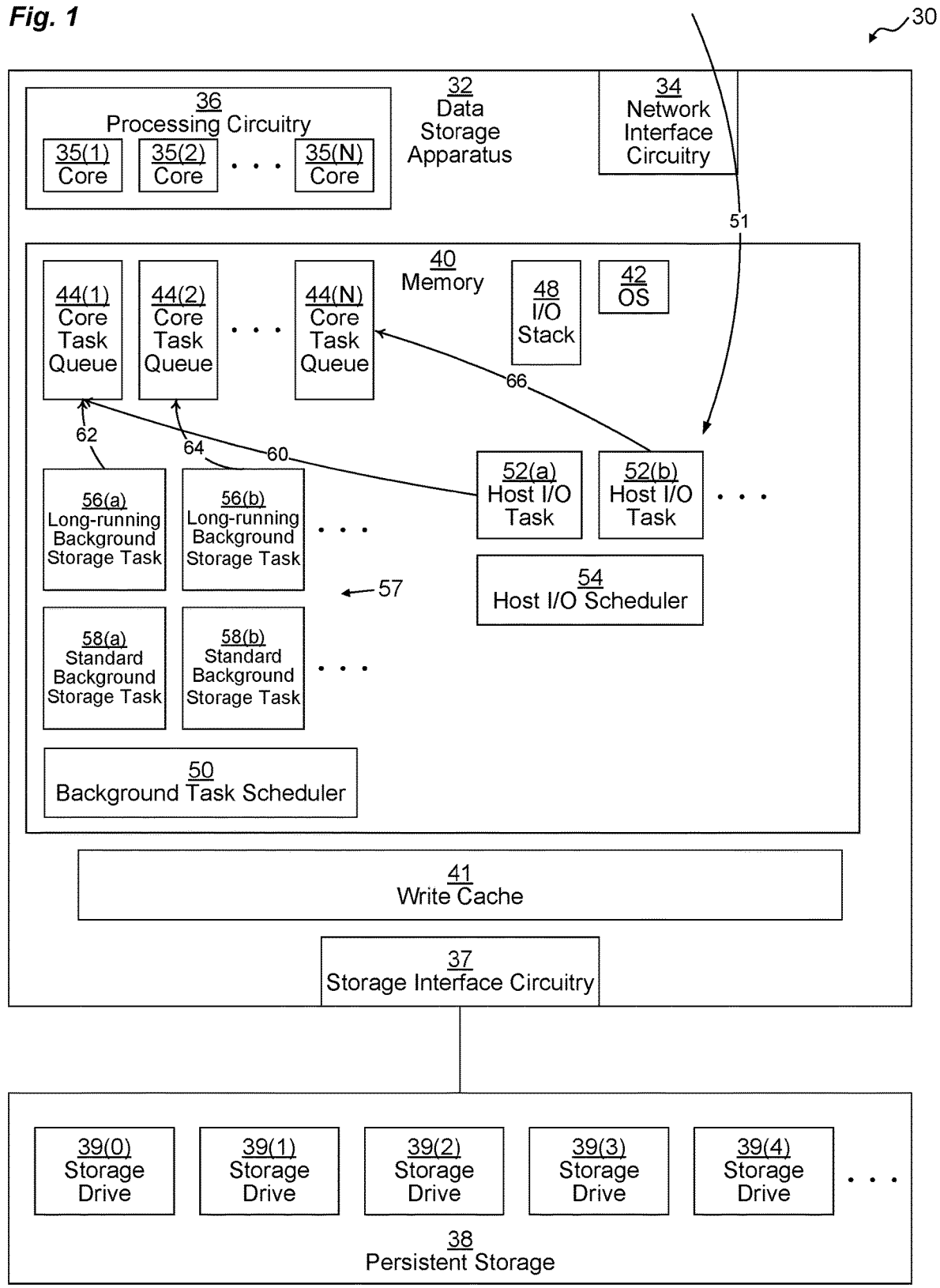
FIG. 1 is a block diagram depicting an example system, apparatus, and data structure arrangement for use in connection with various embodiments.

FIG. 1 depicts an example system 30. System 30 includes one or more data storage apparatus (DSA) 32 in one or more housings connected to persistent storage 38 and one or more host devices (not depicted).

DSA 32 may be any kind of computing device, such as, for example, a personal computer, workstation, server computer, enterprise server, data storage array device, laptop computer, tablet computer, smart phone, mobile computer, etc. In one example embodiment, DSA 32 is a blade server, while in another example embodiment, DSA 32 is a rackmount server. In some embodiments, the DSA 32 and the shared persistent storage 38 are both mounted on the same server rack. In some embodiments, DSA 32 includes one or more storage processing nodes (not depicted) configured in a failover or similar configuration.

DSA 32 at least includes processing circuitry 36, storage interface circuitry 37, and memory 40. In some embodiments, DSA 32 may also include node interface circuitry (not depicted) and network interface circuitry 34 as well as various other kinds of interfaces (not depicted). In some embodiments, DSA 32 may also include a write cache 41, such as, for example, a non-volatile transaction cache. DSA 32 also includes interconnection circuitry between its various components (not depicted).

Processing circuitry 36 may include any kind of processor (e.g., a Central Processing Unit or CPU) or set of processors configured to perform operations, such as, for example, a multi-core microprocessor or a plurality of microprocessors. Processing circuitry 36 includes a plurality of processing cores 35 (also referred to as CPU cores). As depicted, there are N cores 35 (depicted as cores 35(1), 35(2), ..., 35(N)).

Storage interface circuitry 37 controls and provides access to shared persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage devices 39 (depicted as storage drives 39(0), 39(1), 39(2), 39(3), 39(4), ...), such as, for example, hard disk drives, solid-state storage devices (SSDs), flash drives, etc.

Network interface circuitry 34 may include one or more Ethernet cards, cellular modems, Fibre Channel (FC) adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc. Network interface circuitry 34 allows a node 32 to communicate with one or more host devices (not depicted) over the network.

Memory 40 may be any kind of digital system memory, such as, for example, random access memory (RAM). Memory 40 stores an operating system (OS) 42 in operation (e.g., a Linux, UNIX, Windows, MacOS, or similar operating system). Memory 40 also stores an I/O stack 48 configured to process storage requests with respect to the shared persistent storage 38. Memory 40 also stores a set of task queues 44 for each core (depicted as core task queues 44(1), 44(2), ..., 44(N)), a background task scheduler 50, and a host I/O scheduler 54. O/S 42, host I/O stack 48, background task scheduler 50, and host I/O scheduler 54 each execute on processing circuitry 36.

I/O stack 48 is a layered arrangement of drivers and/or other software constructs (not depicted) configured to process I/O storage requests (e.g., host I/O requests 51 received from remote hosts) directed at the DSA 32 as well as background storage tasks 57 initiated by the DSA 32. The I/O storage requests, at the top of the I/O stack 48, are high-level requests directed to particular logical disks and logical addresses therein. As the requests proceed down the stack, these are translated into lower-level access requests to particular physical addresses on disks/drives of the shared persistent storage 38.

In some embodiments, write cache 41 may be a non-volatile transaction cache. A non-volatile transaction cache is a persistent cache that is faster than the shared persistent storage 38, such as, for example, flash memory, 3D XPoint memory produced by Intel Corp. and Micron Corp., and other similar technologies. As the non-volatile transaction cache is persistent, the contents of the non-volatile transaction cache are preserved upon a restart of the DSA 32. Thus, when a cached data page is updated within memory 40, it may be stored forthwith in the non-volatile transaction cache. This arrangement enables an incoming write request to be acknowledged immediately upon storage of its data in the non-volatile transaction cache, even though such data has not yet been persisted to the shared persistent storage 38. Thus, for example, a non-volatile transaction cache may store a "dirty" version of a cached page which differs from a corresponding persistently-stored version of the same page. The page in the non-volatile transaction cache is considered "dirty" because it is more up-to-date than the corresponding persistently-stored page because it has not yet been flushed to shared persistent storage 38.

In operation, when DSA 32 receives a host I/O request 51 from a remote host, DSA 32 creates a host I/O task 52 (depicted as host I/O tasks 50(a), 50(b), ...). Host I/O scheduler 54 then operates to assign the host I/O tasks 52 to particular cores 35 by placing a host I/O tasks 52 into the core task queue 44 for a particular core 35 in accordance with a set of rules. For example, as depicted, host I/O scheduler 54 places 60 host I/O task 52(a) into core task queue 44(1) to be processed by core 35(1).

Background task scheduler 50 also operates to place background storage tasks 57 into particular core task queues 44 for processing by particular respective cores 35. Background storage tasks 57 are tasks that have to do with storage management that are executed out of band with fulfillment of host I/O requests 51, such as for managing the organization of storage. Some of the background storage tasks 57 are long-running background storage tasks 56, while others are standard background storage tasks 58. Long-running background storage tasks 56 may include flush and some rebuild tasks, while standard background storage tasks 58 are other background storage tasks 57 other than the long-running background storage tasks 56. Flush tasks, for example, are tasks that involve persisting data stored either in memory 40 or in write cache 41 into permanent or long-term locations in persistent storage 38. Rebuild tasks are tasks that involve rebuilding data from a failed storage drive 39 onto a replacement storage drive 39 (e.g., RAID rebuild). Because long-running background storage tasks 56 may tie up processing resources, if too many long-running background storage tasks 56 are running on a core 35 at a time, host I/O tasks 52 should not be assigned to also run on that core 35. In one embodiment, once even one long-running background storage task 56 begins to run on a core 35, then no new host I/O tasks 52 are assigned to that core 35 until that long-running background storage task 56 completes. In some embodiments, long-running background storage tasks 56 are biased toward being assigned to lower-numbered cores. Thus, as depicted, background task scheduler 50 assigns 62 long-running background storage task 56(a) to run on core 35(1) by placing it in core task queue 44(1). This may be done even though host I/O task 52(a) is already in task queue 44(1) because tasks 52, 57 are typically not reassigned once placed in a core task queue 44. Also as depicted, background task scheduler 50 assigns 64 long-running background storage task 56(a) to run on core 35(2) by placing it in core task queue 44(2). Then, host I/O scheduler 54 assigns 66 host I/O task 52(b) to run on core 35(N) by placing it in core task queue 44(N) because core task queue 44(N) is not yet running any long-running background storage tasks 56.

Memory 40 may also store various other data structures used by the OS 42, I/O stack 48, background task scheduler 50, host I/O scheduler 54, host I/O tasks 52, background storage tasks 57, and various other applications and drivers. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or shared persistent storage 38 is configured to store programs and data even while the DSA 32 is powered off. The OS 42, I/O stack 48, background task scheduler 50, host I/O scheduler 54, host I/O tasks 52, background storage tasks 57, and various other applications and drivers are typically stored in this persistent storage portion of memory 40 or on shared persistent storage 38 so that they may be loaded into a system portion of memory 40 upon a system restart or as needed. The OS 42, I/O stack 48, background task scheduler 50, host I/O scheduler 54, host I/O tasks 52, background storage tasks 57, and various other applications and drivers, when stored in non-transitory form either in the volatile portion of memory 40 or on shared persistent storage 38 or in persistent portion of memory 40, each form a computer program product. One or more cores 35 of processing circuitry 36 running one or more of the OS 42, I/O stack 48, background task scheduler 50, host I/O scheduler 54, host I/O tasks 52, and background storage tasks 57 thus forms a specialized circuit constructed and arranged to carry out the various processes described herein.

Figure 2:
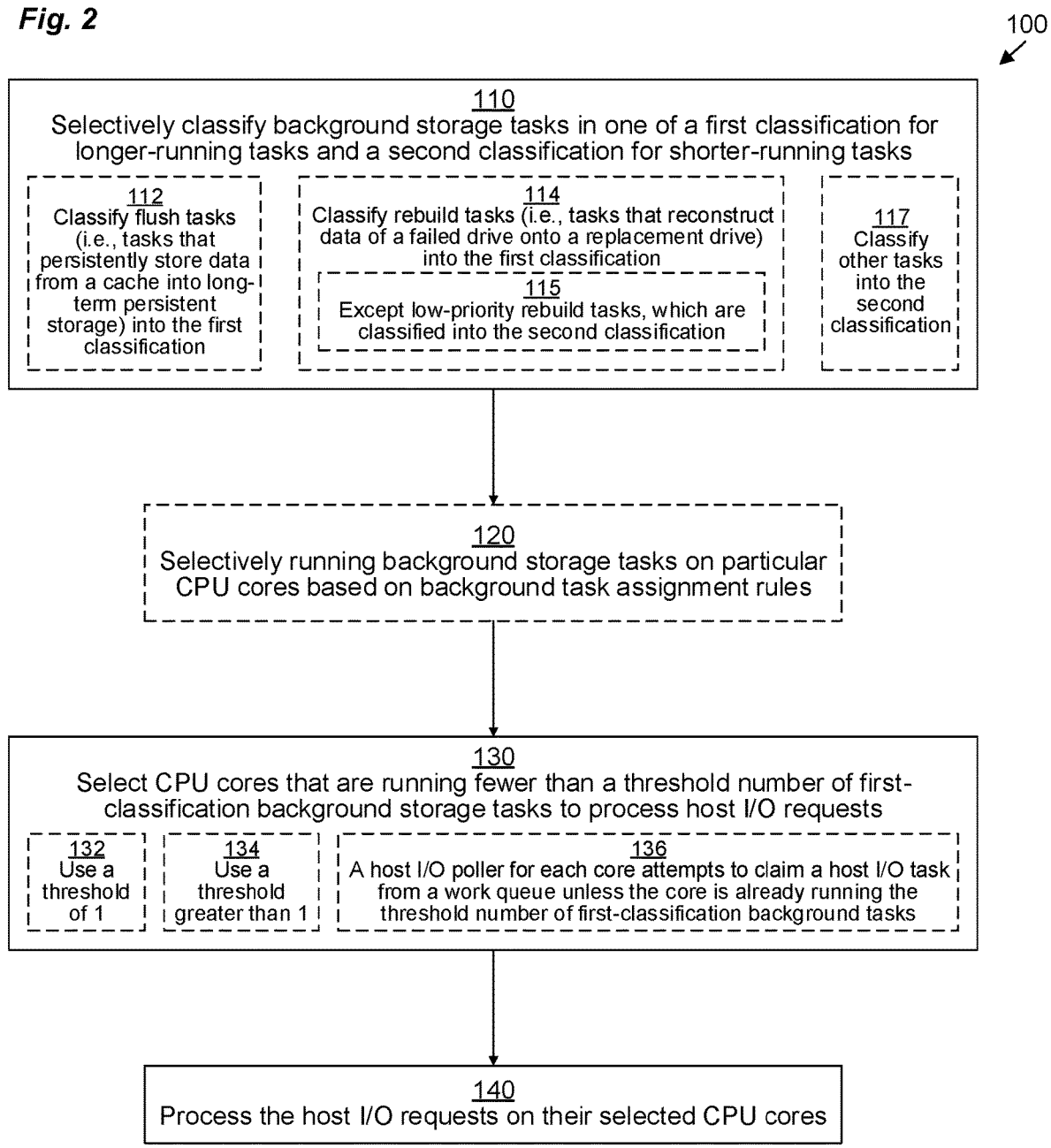
FIG. 2 is a flowchart depicting an example procedure according to various embodiments.

FIG. 2 illustrates an example method 100 performed by a DSA 32 for managing cores 35. It should be understood that any time a piece of software (e.g., OS 42, I/O stack 48, background task scheduler 50, host I/O scheduler 54, host I/O tasks 52, and background storage tasks 57, etc.) is described as performing a method, process, step, or function, what is meant is that a computing device (e.g., DSA 32) on which that piece of software is running performs the method, process, step, or function when executing that piece of software on a core 35 of its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a sub-step is optional, representative of alternate embodiments or use cases, or ancillary to the main thrust of the method 100.

In step 110, DSA 32 selectively classifies background storage tasks 57 in one of a first classification for longer-running tasks (e.g., long-running background storage tasks 56) and a second classification for shorter-running tasks (e.g., standard background storage tasks 58). In some embodiments, step 110 may include one or more of sub-steps 112, 114 (and possibly included sub-step 115), 117.

In sub-step 112, DSA 32 classifies flush tasks (i.e., tasks that persistently store data from a cache 41 into long-term persistent storage 38) into the first classification.

In sub-step 114, DSA 32 classifies rebuild tasks (i.e., tasks that reconstruct data of a failed drive 39 onto a replacement drive 39) into the first classification. In some embodiments, in sub-step 115, DSA 32 excludes certain low-priority rebuild tasks, instead placing those tasks into the second (standard) classification.

In sub-step 117, DSA 32 classifies other tasks (e.g., not yet classified into the first classification in sub-steps 112, 114) into the second classification.

In step 120, DSA 32 selectively runs background storage tasks on particular CPU cores 35 based on background task assignment rules. See below in connection with FIGS. 3-6B, especially FIGS. 4-5, for more details on how this assignment may be performed.

In step 130, host I/O scheduler 54 selects CPU cores 35 that are running fewer than a threshold number 282 (see FIGS. 3A and 3B) of first-classification background storage tasks (e.g., long-running background storage tasks 56) to process host I/O requests 51. In some embodiments, step 130 may include either sub-step 132 or 134, and in some embodiments, step 130 may include sub-step 136.

In sub-step 132, host I/O scheduler 54 uses a threshold number 282 set to a value of 1. In sub-step 134, host I/O scheduler 54 uses a threshold number 282 set to a value greater than 1 (i.e., 2 or greater). Thus, in sub-step 132, if ANY long-running background storage task 56 is already running on a core 35, no additional host I/O tasks 52 are assigned to that core 35 (until any and all long-running background storage tasks 56 running on that core 35 complete), while in sub-step 134, a host I/O task 52 may be assigned to a core 35 running a long-running background storage task 56, as long as there are not too many running on that core 35.

In sub-step 136, host I/O scheduler 54 is made up of several host I/O pollers 254 (see FIGS. 3A and 3B), each host I/O poller 254 managing a different core 35. Thus, in sub-step 136, a host I/O poller 254 for each core 35 attempts to claim a host I/O task 52 from a work queue (e.g., host work queue 271, see FIGS. 3A and 3B) unless that core 35 is already running the threshold number 282 of first-classification background tasks (e.g., long-running background storage tasks 56).

Then, in step 140, DSA 32 processes the host I/O requests 51 by running their associated host I/O tasks 52 on the selected cores 35 from step 130.

Figure 3A:
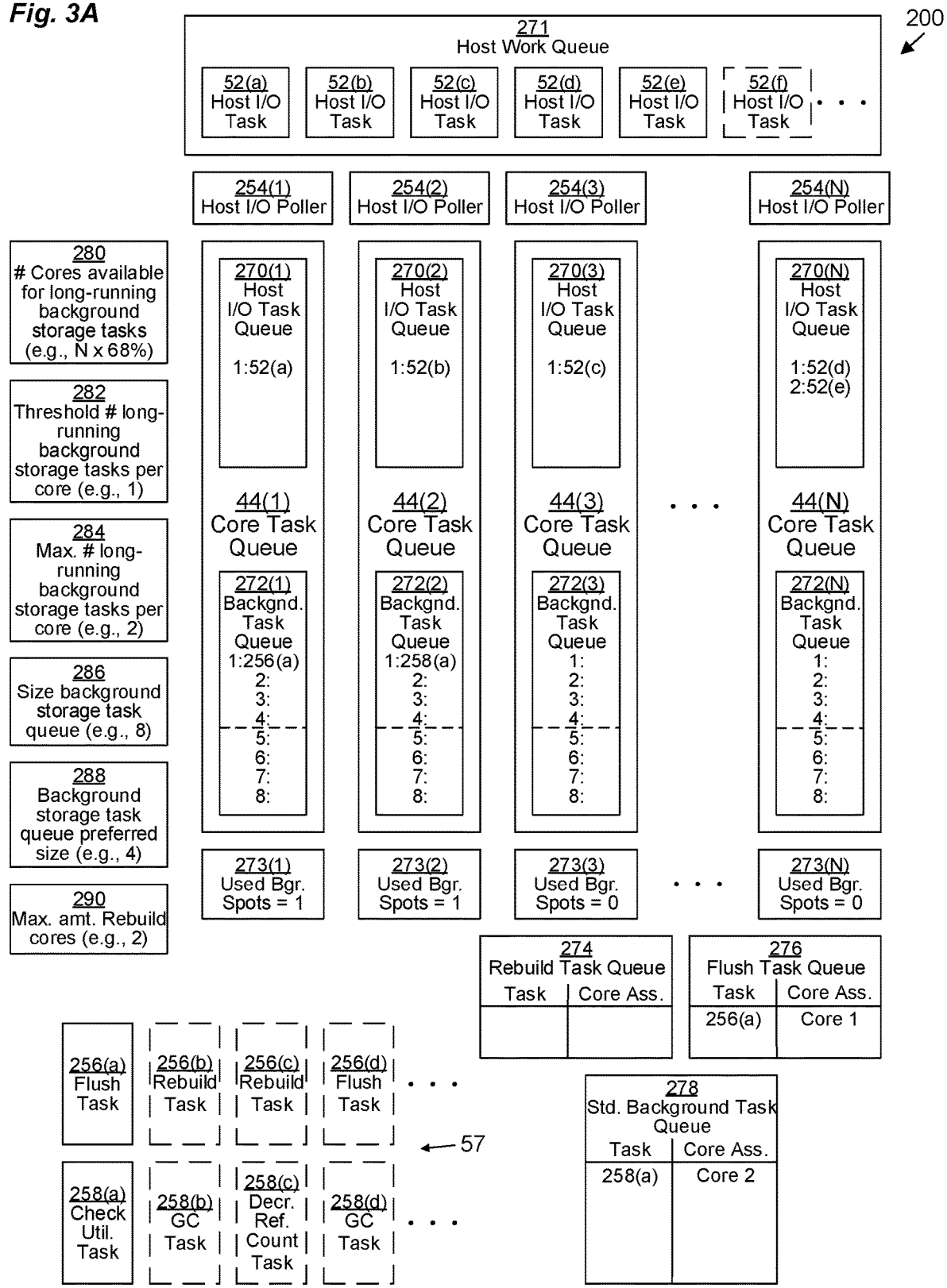
FIGS. 3A and 3B are block diagrams depicting example data structure arrangements for use in connection with various embodiments.

FIG. 3A depicts an example data structure arrangement 200 of memory 40 in the context of performing a set of host I/O tasks 52 and background storage tasks 57.

As depicted in FIG. 3A, host I/O tasks 52(a), 52(b), 52(c), 52(d), 52(e), 52(f) have been received, but host I/O task 52(f) has not yet been assigned to a core task queue 44. Also as depicted in FIG. 3A, background storage tasks 256(a), 256(b), 256(c), 256(d), 258(a), 258(b), 258(c), 258(d) have been created, but only background storage tasks 256(a), 258(a) have yet been assigned to a core task queue 44.

As depicted in FIG. 3A, each core task queue 44 is made up of a host I/O task queue 270 and a background task queue 272. Thus, core task queue 44(1) includes a host I/O task queue 270(1) and a background task queue 272(1); core task queue 44(2) includes a host I/O task queue 270(2) and a background task queue 272(2); core task queue 44(3) includes a host I/O task queue 270(3) and a background task queue 272(3); and core task queue 44(N) includes a host I/O task queue 270(N) and a background task queue 272(N). It should be understood that in some embodiments, one or both of the host I/O task queue 270 and the background task queue 272 may not exist as a component of core task queue 44, but both queues 270, 272 do exist logically, being constructible from other data structures.

As host I/O requests 51 are received, corresponding host I/O tasks 52 are added to a host work queue 271. A per core host I/O poller 254 (depicted as host I/O pollers 254(1), 254(2), 254(3), . . . , 254(N)) runs for each core 35, periodically polling the host work queue 271 for an available host I/O task 52 to assign to that core 35 if it is able to accept a new host I/O task at that time. In some embodiment, each host I/O poller 254 is embodied as a thread that runs on its corresponding core 35. As depicted, host I/O task 52(a) has been assigned to run on core 35(1), as it is referenced in host I/O task queue 270(1); host I/O task 52(b) has been assigned to run on core 35(2), as it is referenced in host I/O task queue 270(2); host I/O task 52(c) has been assigned to run on core 35(3), as it is referenced in host I/O task queue 270(3); and host I/O tasks 52(d), 52(e) have been assigned to run on core 35(N), as they are referenced in host I/O task queue 270(N).

As background storage tasks 57 are created, background task scheduler 50 classifies them as long-running background storage tasks 256 or standard background storage tasks 258 and assigns them to run on an appropriate core 35. Logically, this is equivalent to assigning the storage tasks 57 to background task storage queues 272, although in some embodiments this is actually performed by assigning each background storage task 57 to a core 35 within one of a rebuild task queue 274, a flush task queue 276, or a standard background storage task queue 278. As depicted, flush task 256(a) is assigned to core 35(1) (also called core 1) by being referenced in flush task queue 276 with an assignment to core 1; equivalently, flush task 256(a) can be said to have been placed in queue position 1 of background task queue 272(1). Check utilization task 258(a) is assigned to core 35(2) (also called core 2) by being referenced in standard background task queue 278 with an assignment to core 2; equivalently, check utilization task 258(a) can be said to have been placed in queue position 1 of background task queue 272(2). Check utilization task 258(a) is a standard background storage task 58 that serves to analyze the utilization of segments of storage to determine if garbage collection is needed.

Various values 280-290 may also be stored in memory 40, as depicted in data structure arrangement 200. A number 280 of cores 35 that are available for long-running background storage tasks 56 may be stored in memory 40. In some embodiments, number 280 is defined to be a specific fraction (e.g., within a range of 50%-70%) of the total number, N, of cores 35 that are available to be used for performing storage tasks (e.g., host I/O tasks 52 and background storage tasks 57). In one example embodiment, the fraction is 68%. Thus, if N=20, number 280 is equal to 13 cores 35 (i.e., 20×68%=13.6, which rounds down to 13). Thus, in that embodiment, at most 13 cores 35 can be used for performing long-running background storage tasks 56 (e.g., rebuild and flush tasks), which means that 7 cores 35 are free to be used for standard background storage tasks 58 and host I/O tasks 52.

A threshold number 282 of long-running background storage tasks 56 per core 35 may also be stored in memory 40. In some embodiments, threshold number 282 is defined to be 1, meaning that once ANY long-running background storage task 56 runs on a core 35, no additional host I/O tasks 52 are assigned to that core 35 (until any and all long-running background storage tasks 56 running on that core 35 complete). In other embodiments, threshold number 282 is defined to be an integer greater than 1, meaning that a host I/O task 52 may be assigned to a core 35 running a long-running background storage task 56 as long as there are not already the threshold number 282 of long-running background storage tasks 56 already running on that core 35.

A maximum number 284 of long-running background storage tasks 56 allowed to run on any given core 35 at a time may also be stored in memory 40. In some embodiments, threshold number 282 is defined to be 1, meaning that no more than 1 long-running background storage task 56 is allowed to run on any given core 35 at a time. In other embodiments, threshold number 282 is defined to be an integer greater than 1, meaning that no more than the defined maximum number 284 of long-running background storage task 56 is allowed to run on any given core 35 at a time.

A size 286 for the background storage task queues 272 may also be stored in memory 40. Thus, since, as depicted in FIG. 3A, each background storage task queue 272 has 8 positions, up to 8 background storage tasks 57 may be placed in the background storage task queue 272 at a time, so size 286 would be equal to 8. A preferred size 288 for the background storage task queues 272 may also be stored in memory 40. As depicted in FIG. 3A, the first 4 positions of each background storage task queue 272 are preferred (see below in connection with FIGS. 5, 6A, and 6B), so preferred size 288 would be equal to 4. Typically the preferred size 288 is set to be half of the size 288.

A maximum amount 290 of cores 35 which can be assigned to perform rebuild tasks may also be stored in memory 40. In some embodiments, threshold number 282 is defined to be 2, meaning that no more than 2 cores 35 may be assigned to perform rebuild tasks at a time. In some embodiments, the cores 36 to which rebuild tasks may be assigned are the lowest-numbered cores (e.g., only cores 1 and 2 can perform rebuild tasks).

Figure 3B:
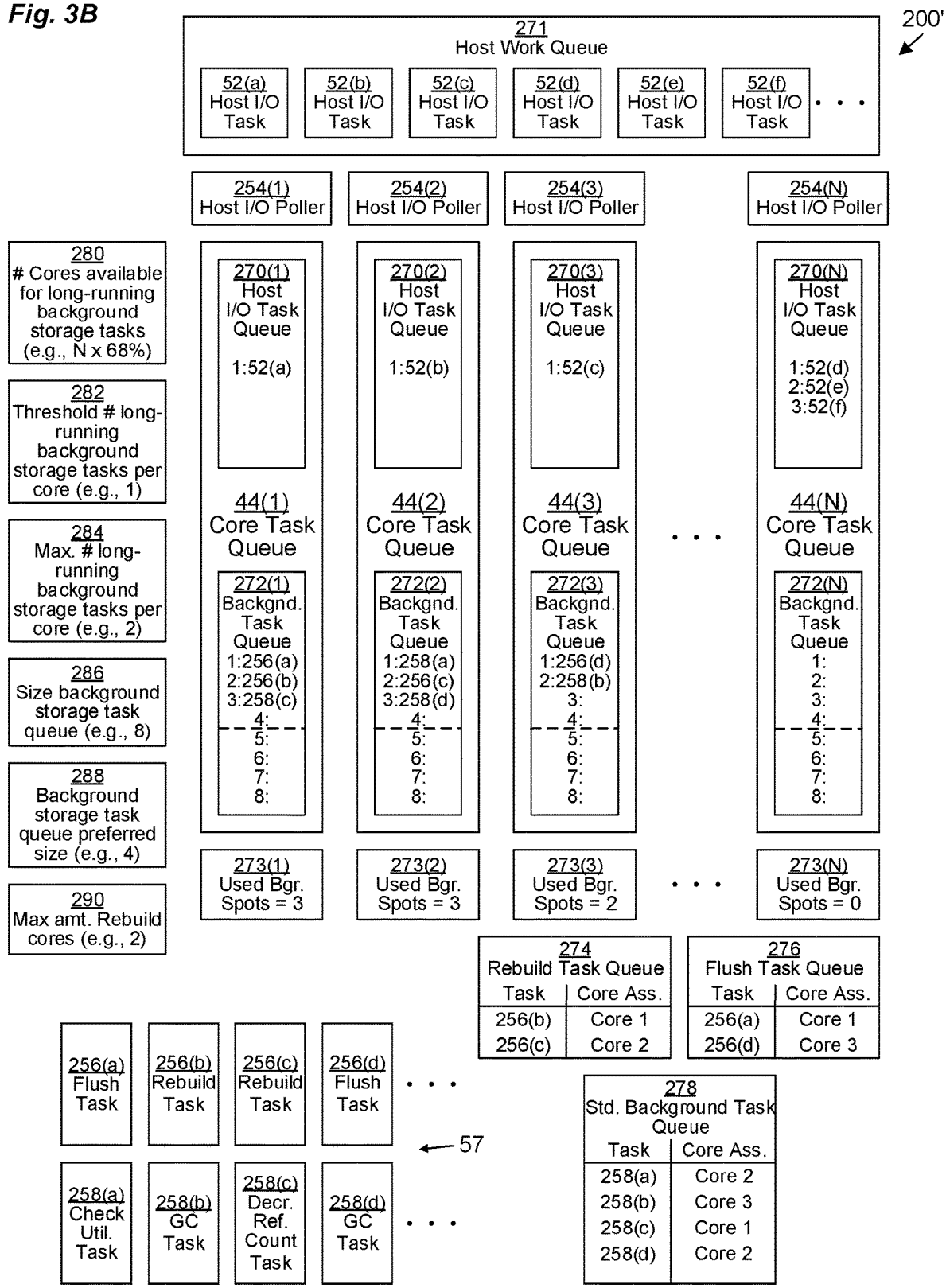

FIG. 3B depicts another example data structure arrangement 200' similar to data structure arrangement 200 but after an additional host I/O task 52 and additional background storage tasks 57 have been assigned to cores 35.

As depicted, rebuild task 256(b) is assigned to core 35(1) (also called core 1) by being referenced in rebuild task queue 274 with an assignment to core 1; equivalently, rebuild task 256(b) can be said to have been placed in queue position 2 of background task queue 272(1). Rebuild task 256(c) is assigned to core 35(2) (also called core 2) by being referenced in rebuild task queue 274 with an assignment to core 2; equivalently, rebuild task 256(c) can be said to have been placed in queue position 2 of background task queue 272(2). Rebuild task 256(c) had to be assigned to core 35(2) because core 35(1) was already running the maximum number 284 (i.e., 2) of long-running background storage tasks 56 (i.e., tasks 256(a), 256(b)), and since the maximum amount 290 of rebuild cores is 2, rebuild task 256(c) cannot be assigned to any core 35 with a number higher than 2. Flush task 256(d) is assigned to core 35(3) (also called core 3) by being referenced in flush task queue 276 with an assignment to core 3; equivalently, flush task 256(d) can be said to have been placed in queue position 1 of background task queue 272(3). Flush task 256(d) could not have been assigned to core 35(1) because core 35(1) was already running the maximum number 284 (i.e., 2) of long-running background storage tasks 56 (i.e., tasks 256(a), 256(b)). Flush task 256(d) also could not have been assigned to core 35(2) because core 35(2) was already running a rebuild task 256(c), and, in some embodiments, a flush task cannot be assigned to run on a core 35 that is already running a rebuild task (see below in connection with sub-step 317 of FIG. 4).

Garbage collection (GC) task 258(b) is assigned to core 35(3) (also called core 3) by being referenced in standard background task queue 278 with an assignment to core 3; equivalently, GC task 258(b) can be said to have been placed in queue position 2 of background task queue 272(3). GC task 258(b) is a standard background storage task 58 that serves to perform garbage collection. Decrement reference count task 258(c) is assigned to core 35(1) (also called core 1) by being referenced in standard background task queue 278 with an assignment to core 1; equivalently, decrement reference count task 258(c) can be said to have been placed in queue position 3 of background task queue 272(1). Garbage collection (GC) task 258(d) is assigned to core 35(2) (also called core 2) by being referenced in standard background task queue 278 with an assignment to core 2; equivalently, GC task 258(d) can be said to have been placed in queue position 3 of background task queue 272(2).

As depicted, host I/O task 52(f) has been assigned to run on core 35(N), as it is referenced in host I/O task queue 270(N). This assignment has been made because host I/O task 52(f) is ineligible to be assigned to cores 35(1), 35(2), 35(3) because each of those cores 35 is already running at least the threshold number 282 (i.e., 1) of long-running background storage operations 56.

Although rebuild task queue 274 has been shown with a particular example structure in FIGS. 3A and 3B, in another example embodiment, rebuild task queue 274 may have a structure as depicted in Table 1. Table 1 depicts the same assignment of background storage tasks 57 as in FIG. 3B, but with a different data structure arrangement for rebuild task queue 274.

TABLE 1

Example arrangement of rebuild task queue 274

| Position | Core Assignment | In Use? | Rebuild Task |
|---|---|---|---|
| 1 | 1 | 1 | 256(b) |
| 2 | 1 | 0 | |
| 3 | 2 | 1 | 256(c) |
| 4 | 2 | 0 | |

Although flush task queue 276 has been shown with a particular example structure in FIGS. 3A and 3B, in another example embodiment, flush task queue 276 may have a structure as depicted in Table 2. Table 2 depicts the same assignment of background storage tasks 57 as in FIG. 3B, but with a different data structure arrangement for rebuild task queue 276. As depicted in the example of Table 2, the number 280 of cores 35 available for long-running background storage tasks 56 is 4.

TABLE 2

Example arrangement of flush task queue 276

| Position | Core Assignment | In Use? | Flush Task |
|---|---|---|---|
| 1 | 1 | 1 | 256(a) |
| 2 | 1 | 0 | |
| 3 | 2 | 0 | |
| 4 | 2 | 0 | |
| 5 | 3 | 1 | 256(d) |
| 6 | 3 | 0 | |
| 7 | 4 | 0 | |
| 8 | 4 | 0 | |

Although standard background task queue 278 has been shown with a particular example structure in FIGS. 3A and 3B, in another example embodiment, standard background task queue 278 may have a structure as depicted in Table 3. Table 3 depicts the same assignment of background storage tasks 57 as in FIG. 3B, but with a different data structure arrangement for standard background task queue 278. As depicted in the example of Table 3, the total number of cores 35, N, available for storage tasks 52, 57 is 6.

TABLE 3

Example arrangement of standard background task queue 278

| Position | Core Assignment | In Use? | Standard Background Task |
|---|---|---|---|
| 1 | 1 | 1 | 258(c) |
| 2 | 1 | 0 | |
| 3 | 1 | 0 | |
| 4 | 1 | 0 | |
| 5 | 1 | 0 | |
| 6 | 1 | 0 | |
| 7 | 1 | 0 | |
| 8 | 1 | 0 | |
| 9 | 2 | 1 | 258(a) |
| 10 | 2 | 1 | 258(d) |
| 11-15 | 2 | 0 | |
| 16 | 2 | 0 | |
| 17 | 3 | 1 | 258(b) |

TABLE 3-continued

Example arrangement of standard background task queue 278

| Position | Core Assignment | In Use? | Standard Background Task |
|---|---|---|---|
| 18-23 | 3 | 0 | |
| 24 | 3 | 0 | |
| 25 | 4 | 0 | |
| 26-31 | 4 | 0 | |
| 32 | 4 | 0 | |
| 33 | 5 | 0 | |
| 34-39 | 5 | 0 | |
| 40 | 5 | 0 | |
| 41 | 6 | 0 | |
| 42-47 | 6 | 0 | |
| 48 | 6 | 0 | |

By summing up the values of the "In Use?" column for a particular core 35 in each of queues 274, 276, 278, the number 273 of used background spots for that core 35 can be calculated. Thus, for example, for core 35(1) (also known as core 1), the number 273 of used background spots is 3; for core 35(2) (also known as core 2), the number 273 of used background spots is 3; and for core 35(3) (also known as core 3), the number 273 of used background spots is 2.

Figure 4:
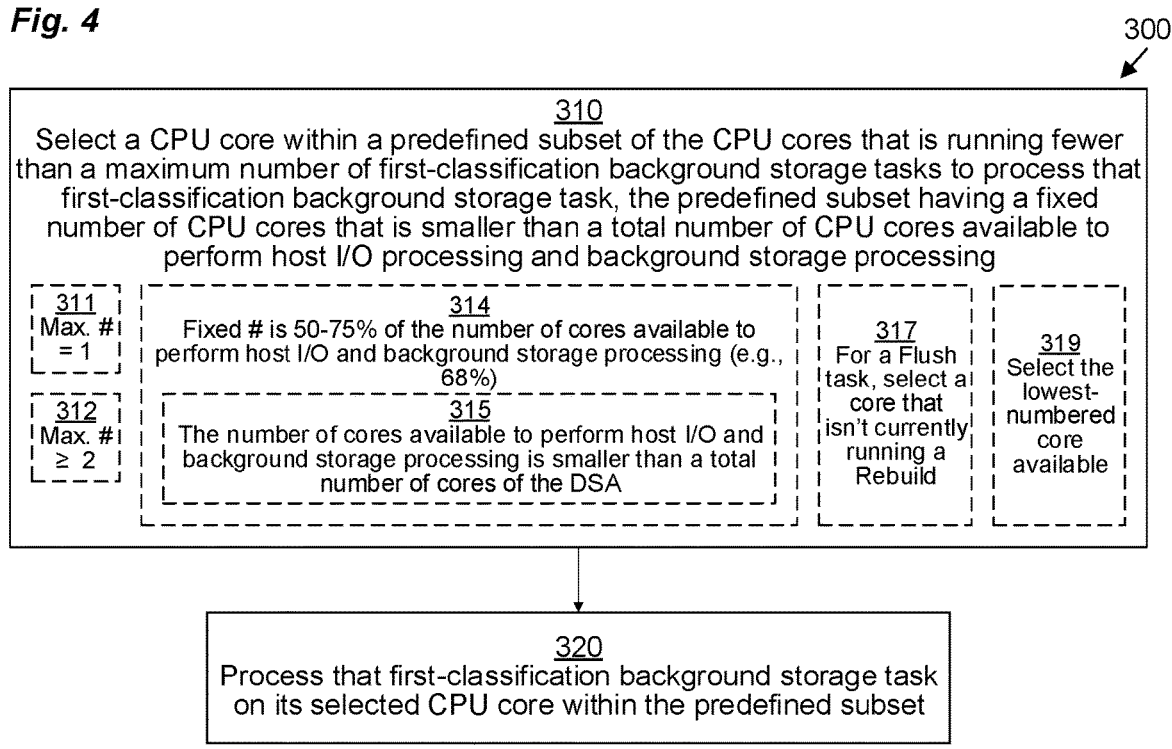
FIG. 4 is a flowchart depicting an example procedure according to various embodiments.

FIG. 4 illustrates an example method 300 performed by DSA 32 for selectively running long-running background storage tasks 56 on particular cores 35 based on background task assignment rules (see step 120 of FIG. 2). It should be understood that one or more of the steps or sub-steps of method 300 may be omitted in some embodiments. Similarly, in some embodiments, one or more steps or sub-steps may be combined together or performed in a different order. Dashed lines indicate that a sub-step is either optional or representative of alternate embodiments or use cases.

Method 300 may be performed separately for each first-classification background storage task 56(X) identified in step 110 of FIG. 2.

In step 310, background task scheduler 50 selects a core 35 within a predefined subset of the cores 35 that is running fewer than a maximum number 284 of first-classification background storage tasks 56 to process that first-classification background storage task 56(X), the predefined subset having a fixed number 280 of cores 35 that is smaller than a total number, N, of CPU cores 35 available to perform host I/O processing and background storage processing. Step 310 may include various sub-steps.

In some embodiments, in sub-step 311, the maximum number 284 is equal to 1. In other embodiments, in sub-step 312, the maximum number 284 is greater than or equal to 2.

In some embodiments, the fixed number 280 of cores 35 of the predefined subset is within a range of 50% to 75% (e.g., 68%) of the total number, N, of CPU cores 35 available to perform host I/O processing and background storage processing. In some of these embodiments, in sub-step 315, the number, N, of cores 35 available to perform host I/O and background storage processing is smaller than a total number of cores of the DSA 32. Thus, for example, in one embodiment, the DSA 32 has 56 CPU cores 35, ten of which are used for running the OS 42 and other tasks, and 46 of which are available for performing host I/O processing and background storage processing. 31 of those cores 35 make up the predefined subset (i.e., cores 35 numbered 1-31).

In some embodiments, in sub-step 317, when the first-classification background storage task 56(X) is a flush task, background task scheduler 50 selects a core 35 within the predefined subset that is not already running a rebuild task.

In some embodiments, in sub-step 319, background task scheduler 50 selects the lowest-numbered core 35 within the predefined subset that is available to be selected.

Then, in step 320, DSA 32 may begin executing that first-classification background storage task 56(X) on the particular core 35 selected in step 310.

Figure 5:
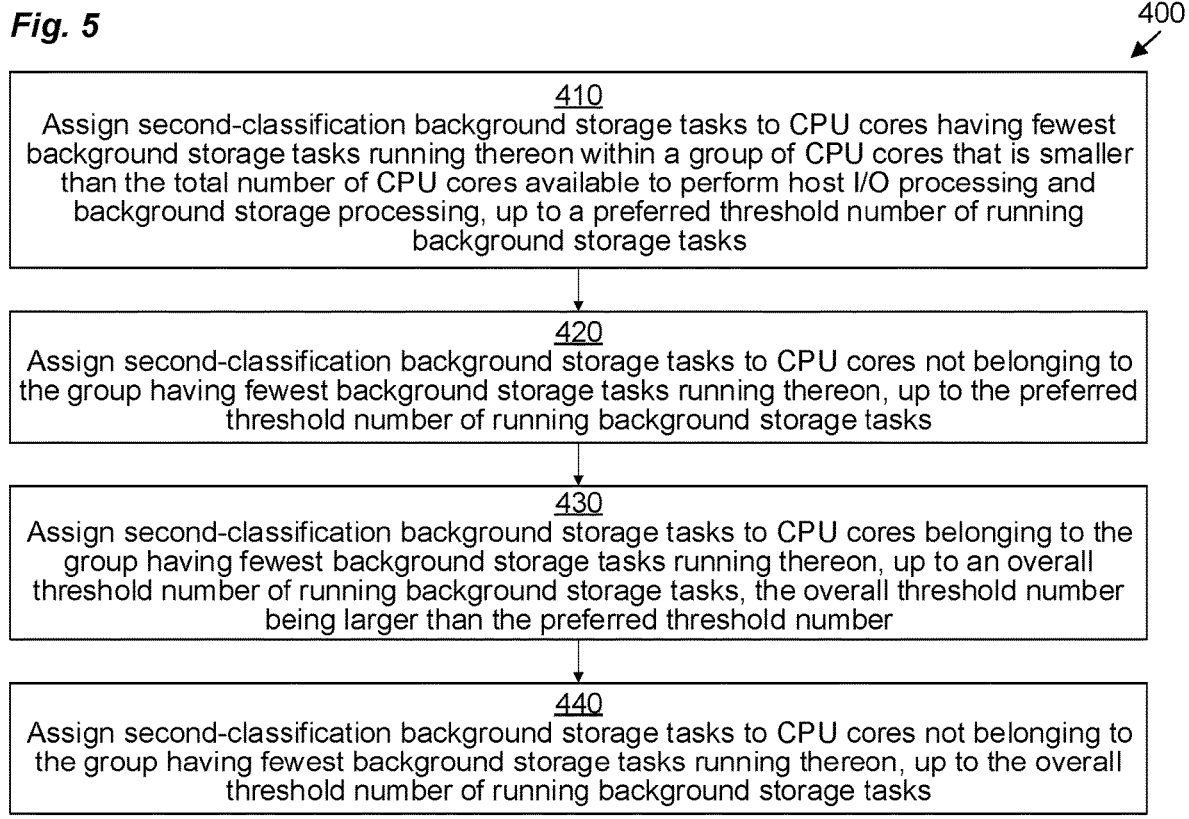
FIG. 5 is a flowchart depicting an example procedure according to various embodiments.

FIG. 5 illustrates an example method 400 performed by DSA 32 for selectively running standard background storage tasks 58 on particular cores 35 based on background task assignment rules (see step 120 of FIG. 2). It should be understood that one or more of the steps or sub-steps of method 300 may be omitted in some embodiments. Similarly, in some embodiments, one or more steps or sub-steps may be combined together or performed in a different order.

In step 410, background task scheduler 50 assigns second-classification background storage tasks 58 to cores 35 having fewest background storage tasks 57 running thereon within a group of cores 35 that is smaller than the total number, N, of cores 35 available to perform host I/O processing and background storage processing, up to a preferred threshold number 288 of running background storage tasks 57. In some embodiments, the group contains half of the total number, N, of cores 35 available to perform host I/O processing and background storage processing. Thus, for example, in the above example in which N=46 cores, the group contains 23 cores 35. These may be numbered cores 1-23, with the cores 35 that are not in the group numbered 24-46.

Figure 6A:
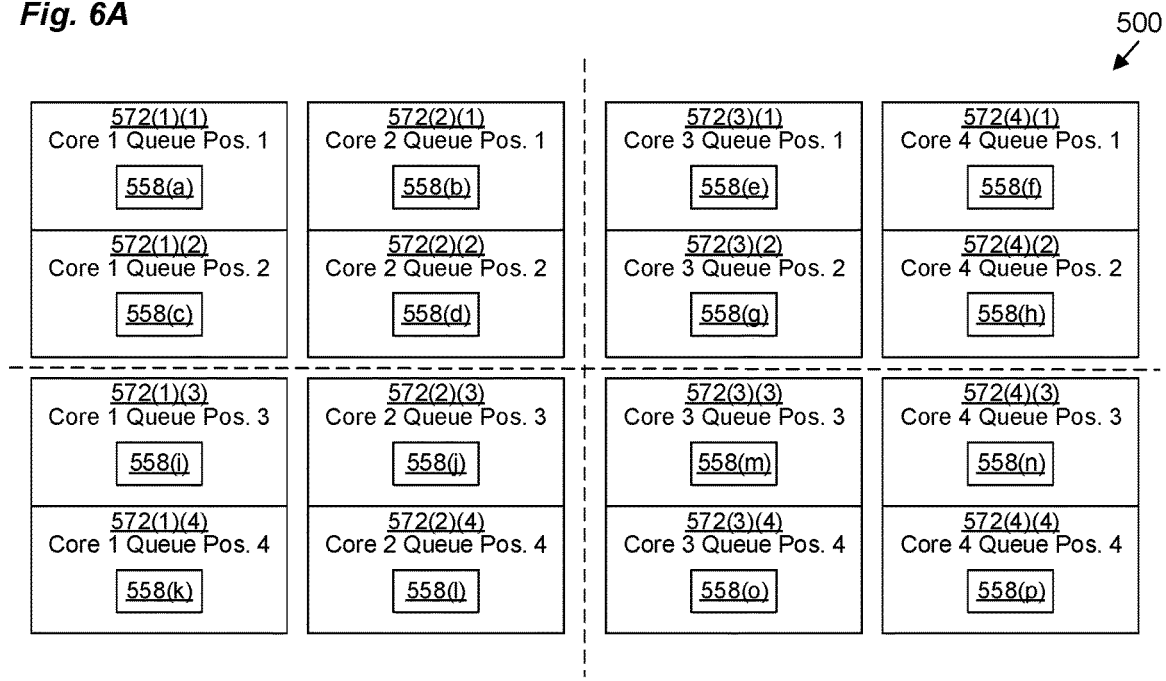
FIGS. 6A and 6B are block diagrams depicting example data structure arrangements for use in connection with various embodiments.

As another example, described in connection with FIG. 6A, N=4, so the group contains 2 cores 35, numbered 1-2. The preferred threshold number 288 is also 2. In this example, there are no long-running background storage tasks 56 for the sake of clarity. Thus, as depicted within arrangement 500 of FIG. 6A, first standard background storage task 558(a) is assigned to location 572(1)(1)—position 1 of background task queue 272 for core 35(1). Then, the next standard background storage task 558(b) is assigned to location 572(2)(1)—position 1 of background task queue 272 for core 35(2), since core 35(2) has fewer background storage tasks 57 in its queue 272 than does core 35(1).

Then, the next standard background storage task 558(c) is assigned to location 572(1)(2)—position 2 of background task queue 272 for core 35(1), since only cores 35(1), 35(2) are in the group, and there is a bias towards selecting lower-numbered cores 35. Then, the next standard background storage task 558(d) is assigned to location 572(2)(2)—position 2 of background task queue 272 for core 35(2), since core 35(2) has fewer background storage tasks 57 in its queue 272 than does core 35(1), the other member of the group. At this point, the group has reached the preferred threshold number 288 of running background storage tasks 57.

Returning to FIG. 5, after step 410, in step 420, background task scheduler 50 assigns second-classification background storage tasks 58 to cores 35 not belonging to the group having fewest background storage tasks 57 running thereon, up to the preferred threshold number 288 of running background storage tasks 57.

Thus, returning to FIG. 6A, the next standard background storage task 558(e) is assigned to location 572(3)(1)—position 1 of background task queue 272 for core 35(3), since core 35(3) is not part of the group and it has zero background storage tasks 57 running thereon (since there is a bias to the lowest-numbered cores). Then, the next standard background storage task 558(f) is assigned to location 572(4)(1)—position 1 of background task queue 272 for core 35(4), since core 35(4) has fewer background storage tasks 57 in its queue 272 than does core 35(3), the other core 35 not in the group. Similarly, the next two standard background storage tasks 558(g), 558(h) are assigned to locations 572(3)(2), 572(4)(2), respectively. At this point, both the group and the cores 35 outside the group have reached the preferred threshold number 288 of running background storage tasks 57.

Returning to FIG. 5, after step 420, in step 430, background task scheduler 50 assigns second-classification background storage tasks 58 to cores 35 belonging to the group having fewest background storage tasks 57 running thereon, up to an overall threshold number of running background storage tasks (i.e., size 286), the overall threshold number 286 being larger than the preferred threshold number 288.

Thus, returning to FIG. 6A, the next standard background storage task 558(i) is assigned to location 572(1)(3)—position 3 of background task queue 272 for core 35(1), since core 35(1) is again part of the group and it has two background storage tasks 57 running thereon (since there is a bias to the lowest-numbered cores). Then, the next standard background storage task 558(j) is assigned to location 572(2)(3)—position 3 of background task queue 272 for core 35(2), since core 35(2) has fewer background storage tasks 57 in its queue 272 than does core 35(1), the other core 35 in the group. Similarly, the next two standard background storage tasks 558(k), 558(1) are assigned to locations 572(1)(4), 572(2)(4), respectively. At this point, both cores 35(1), 35(2) of the group have reached the size 286 of their background task queues 272 which are now both full.

Returning to FIG. 5, after step 430, in step 440, background task scheduler 50 assigns second-classification background storage tasks 58 to cores 35 not belonging to the group having fewest background storage tasks 57 running thereon, up to the overall threshold number (i.e., size 286) of running background storage tasks 57.

Thus, returning to FIG. 6A, the next standard background storage task 558(m) is assigned to location 572(3)(3)—position 3 of background task queue 272 for core 35(3), since core 35(3) is not part of the group and it has two background storage tasks 57 running thereon (since there is a bias to the lowest-numbered cores). Then, the next standard background storage task 558(n) is assigned to location 572(4)(3)—position 3 of background task queue 272 for core 35(4), since core 35(4) has fewer background storage tasks 57 in its queue 272 than does core 35(3), the other core 35 not in the group. Similarly, the next two standard background storage tasks 558(o), 558(p) are assigned to locations 572(3)(4), 572(4)(4), respectively. At this point, both the group and the cores 35 outside the group have reached the size 286 of their background task queues 272 which are now all full.

Figure 6B:
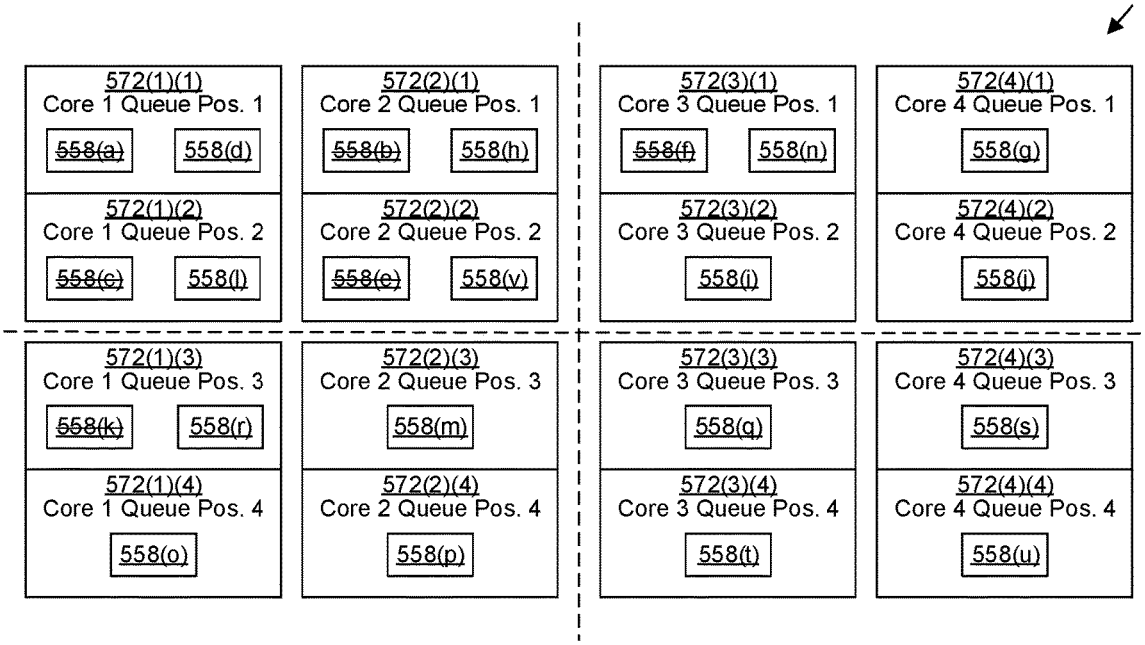

FIG. 6B represents another example arrangement 500' with a different sequence of standard background storage tasks 558. As depicted, first standard background storage task 558(a) is assigned to location 572(1)(1) as before, followed by standard background storage tasks 558(b), 558(c) being assigned to locations 572(2)(1), 572(1)(2), respectively, as before. However, prior to background task scheduler 50 assigning the next standard background storage task 558(d), task 558(a) completes (as indicated by the strikethrough). That allows standard background storage task 558(d) to be assigned to location 572(1)(1). Operation, then proceeds with the next standard background storage task 558(e) being assigned to location 572(2)(2), and the following standard background storage tasks 558(f), 558(g) being assigned to locations 572(3)(1), 572(4)(1), respectively. However, prior to background task scheduler 50 assigning the next standard background storage task 558(h), task 558(b) completes (as indicated by the strikethrough). That allows standard background storage task 558(h) to be assigned to location 572(2)(1). Similarly, completion of task 558(k) allows task 558(r) to be assigned to location 572(1)(3), and completion of task 558(e) allows task 558(v) to be assigned to location 572(2)(2).

Thus, techniques have been presented for dynamically assigning both background storage tasks 57 and host I/O processing tasks 52 to cores 35 in a manner that prevents starvation of CPU resources while also promoting efficiency in CPU utilization. This result may be achieved by selectively assigning host I/O tasks 52 to cores 35 that are running few, if any, long-running background storage tasks 56. In some embodiments, the number of cores 35 allowed to execute long-running background storage tasks 56 may be limited, such as, for example, to some maximum percentage of the total cores 35 in the system that are available for processing storage operations 52, 57. In some embodiments, short-running background storage tasks 58 may be assigned to cores 35 in a balanced manner. In some embodiments, short-running background storage tasks 58 may be preferentially assigned to a first subset of cores 35 to reduce resource contention with host I/O requests 51.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, as used herein and unless a specific statement is made to the contrary, the word "subset" means a strict subset that contains fewer elements than the set of which it is indicated to be a part, and a subset also contains at least one element.

Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of managing CPU (Central Processing Unit) cores in a data storage apparatus (DSA) configured to perform both host I/O (Input/Output) processing and background storage processing, the method comprising:
   prior to assigning respective background storage tasks to CPU cores, selectively classifying the respective background storage tasks in one of a first classification for longer-running tasks and a second classification for shorter-running tasks, wherein the longer-running tasks are known in advance to run for longer durations than the shorter-running tasks, the longer-running tasks including flush and high-priority RAID rebuild tasks and the shorter-running tasks including other types of tasks that are not flush or high-priority RAID rebuild tasks;
   selecting CPU cores that are running fewer than a threshold number of first-classification background storage tasks to process host I/O requests, the threshold number being an integer greater than zero;
   assigning second-classification background storage tasks to CPU cores based on numbers of background storage tasks running on each CPU core;
   receiving a plurality of host I/O requests; and
   processing the plurality of host I/O requests on the selected CPU cores,
   wherein the method further comprises, for each first-classification background storage task:
      selecting a CPU core within a predefined subset of the CPU cores that is running fewer than a maximum number of first-classification background storage tasks to process the respective first-classification background storage task, the predefined subset having a fixed number of CPU cores that is smaller than a total number of CPU cores available to perform the host I/O processing and background storage processing, the maximum number being an integer greater than zero; and
      processing the respective first-classification background storage task on its selected CPU core within the predefined subset.

2. The method of claim 1 wherein the threshold number is one.

3. The method of claim 2 wherein the maximum number is also one.

4. The method of claim 1 wherein selectively classifying background storage tasks includes classifying flush tasks into the first classification, flush tasks being tasks that persistently store data from a cache into long-term persistent storage.

5. The method of claim 4 wherein selectively classifying background storage tasks further includes classifying rebuild tasks into the first classification, rebuild tasks being tasks that reconstruct data of a failed drive onto a replacement drive.

6. The method of claim 5,
wherein the maximum number is at least two; and
selecting the CPU core within the predefined subset of the CPU cores includes, for a flush task, selecting as the CPU core a CPU core from the predefined subset that is not running a rebuild task.

7. The method of claim 1 wherein the fixed number of CPU cores is within a range of 50% to 75% of the total number of CPU cores available to perform the host I/O processing and background storage processing.

8. The method of claim 7 wherein the total number of CPU cores available to perform the host I/O processing and background storage processing is smaller than a total number of CPU cores of the DSA.

9. The method of claim 1 wherein assigning second-classification background storage tasks to CPU cores based on numbers of background storage tasks running on each CPU core includes assigning second-classification background storage tasks to CPU cores having fewest background storage tasks running thereon within a group of CPU cores that is smaller than the total number of CPU cores available to perform the host I/O processing and background storage processing, up to a preferred threshold number of running background storage tasks.

10. The method of claim 9 wherein assigning second-classification background storage tasks to CPU cores based on numbers of background storage tasks running on each CPU core further includes, once the preferred threshold number of running background storage tasks has been reached on the CPU cores of the group, assigning second-classification background storage tasks to CPU cores not belonging to the group having fewest background storage tasks running thereon, up to the preferred threshold number of running background storage tasks.

11. The method of claim 10 wherein assigning second-classification background storage tasks to CPU cores based on numbers of background storage tasks running on each CPU core further includes, once the preferred threshold number of running background storage tasks has been reached on the CPU cores not belonging the group, assigning second-classification background storage tasks to CPU cores belonging to the group having fewest background storage tasks running thereon, up to an overall threshold number of running background storage tasks, the overall threshold number being larger than the preferred threshold number.

12. A data storage apparatus (DSA) comprising:
network interface circuitry connecting to a remote host over a network;
persistent storage storing data; and
a plurality of CPU (Central Processing Unit) cores connected to memory, the CPU cores connected to the memory being configured to perform both host I/O (Input/Output) processing and background storage processing and to:
prior to assignment of respective background storage tasks to CPU cores, selectively classify the respective background storage tasks in one of a first classification for longer-running tasks and a second classification for shorter-running tasks, wherein the longer-running tasks are known in advance to run for longer durations than the shorter-running tasks, the longer-running tasks including flush and high-priority RAID rebuild tasks and the shorter-running tasks including other types of tasks that are not flush or high-priority RAID rebuild tasks;
select CPU cores that are running fewer than a threshold number of first-classification background storage tasks to process host I/O requests, the threshold number being an integer greater than zero;
assign second-classification background storage tasks to CPU cores based on numbers of background storage tasks running on each CPU core;
receive a plurality of host I/O requests; and
process the plurality of host I/O requests on the selected CPU cores,
wherein the plurality of CPU cores connected to the memory is further configured to:
select a CPU core within a predefined subset of the CPU cores that is running fewer than a maximum number of first-classification background storage tasks to process the respective first-classification background storage task, the predefined subset having a fixed number of CPU cores that is smaller than a total number of CPU cores available to perform the host I/O processing and background storage processing, the maximum number being an integer greater than zero; and
process the respective first-classification background storage task on its selected CPU core within the predefined subset.

13. The DSA of claim 12 wherein the fixed number of CPU cores is within a range of 50% to 75% of the total number of CPU cores available to perform the host I/O processing and background storage processing.

14. The DSA of claim 13 wherein the total number of CPU cores available to perform the host I/O processing and background storage processing is smaller than a total number of CPU cores of the DSA.

15. A computer program product comprising a non-transitory computer-readable storage medium storing a set of instructions, which, when performed by processing circuitry of a data storage apparatus (DSA), cause the DSA to manage CPU (Central Processing Unit) cores configured to perform both host I/O (Input/Output) processing and background storage processing by:
prior to assigning respective background storage tasks to CPU cores, selectively classifying the respective background storage tasks in one of a first classification for longer-running tasks and a second classification for shorter-running tasks, wherein the longer-running tasks are known in advance to run for longer durations than the shorter-running tasks, the longer-running tasks including flush and high-priority RAID rebuild tasks and the shorter-running tasks including other types of tasks that are not flush or high-priority RAID rebuild tasks;
selecting CPU cores that are running fewer than a threshold number of first-classification background storage tasks to process host I/O requests, the threshold number being an integer greater than zero;
assigning second-classification background storage tasks to CPU cores based on numbers of background storage tasks running on each CPU core;
receiving a plurality of host I/O requests; and processing the plurality of host I/O requests on the selected CPU cores, wherein the set of instructions, when performed by the processing circuitry, further cause the DSA to, for each first-classification background storage task:

select a CPU core within a predefined subset of the CPU cores that is running fewer than a maximum number of first-classification background storage tasks to process the respective first-classification background storage task, the predefined subset having a fixed number of CPU cores that is smaller than a total number of CPU cores available to perform the host I/O processing and background storage processing, the maximum number being an integer greater than zero; and process the respective first-classification background storage task on its selected CPU core within the predefined subset.

16. The computer program product of claim 15 wherein the threshold number is one.

17. The method of claim 1, wherein the second-classification tasks include a garbage collection task.

18. The method of claim 17, wherein the second-classification tasks further include a decrement reference count task.

19. The method of claim 1, wherein the second-classification tasks further include a low-priority rebuild task.

* * * * *